United States Patent [19]

Kine

[11] 4,179,013

[45] Dec. 18, 1979

[54] MEANS FOR ENSURING SECUREMENT OF A BRAKE ROTARY BODY TO A WHEEL HUB

[75] Inventor: Masayoshi Kine, Osaka, Japan

[73] Assignee: Shimano Industrial Company Limited, Osaka, Japan

[21] Appl. No.: 931,003

[22] Filed: Aug. 4, 1978

[30] Foreign Application Priority Data

Aug. 9, 1977 [JP] Japan .................... 52/106846[U]

[51] Int. Cl.² .......................................... B62L 1/00
[52] U.S. Cl. .................................. 188/26; 188/77 R
[58] Field of Search ............... 188/26, 77 R, 134, 166, 188/167; 192/6 B, 6 R

[56] References Cited

U.S. PATENT DOCUMENTS

| | | | |
|---|---|---|---|
| 1,306,766 | 6/1919 | Kuijper | 188/26 |
| 2,154,188 | 4/1939 | Warrington | 188/26 X |
| 2,487,711 | 11/1949 | Jennings | 188/26 X |

*Primary Examiner*—Duane A. Reger
*Attorney, Agent, or Firm*—Stevens, Davis, Miller & Mosher

[57] ABSTRACT

A coil spring is provided which extends around and along a peripheral cylindrical surface formed of a cylindrical boss defined at the central portion of a rotary body and an adjacent cylindrical mounting tube of a bicycle wheel hub to which the rotary body is screwed for rotation therewith. When the rotary body receives braking torque from a braking surface applied thereto in a manner which would cause an unscrewing of the rotary body from the mounting tube, the coil spring becomes smaller in diameter to tighten about the cylindrical boss and mounting tube to prevent the unscrewing of the rotary body.

11 Claims, 8 Drawing Figures

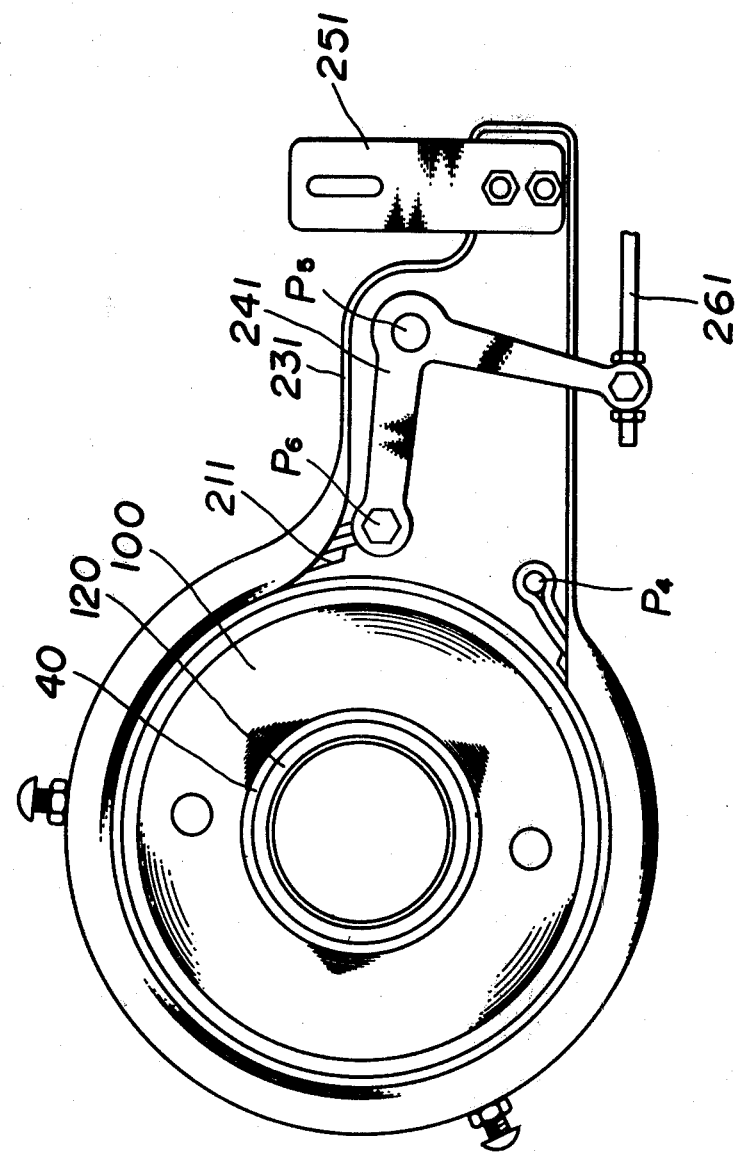

MEANS FOR ENSURING SECUREMENT OF A BRAKE ROTARY BODY TO A WHEEL HUB

BACKGROUND OF THE INVENTION

The present invention relates to a bicycle brake assembly which is used in conjunction with the hub of a bicycle and, more particularly, to a brake assembly which includes a rotary body screwed onto the mounting tube of a wheel hub, the hub further including a hub shaft secured to the frame of the bicycle and a hub shell rotatably supported thereon. The hub shell comprises a pair of flanges and at least one mounting cylinder provided with screw threads on the outer periphery thereof which forms the mounting tube.

In this type of brake assembly, the rotary body engages via a screw coupling with the mounting tube on the hub and is adapted to rotate together with the hub. A braking member is further provided having a contact face which comes into contact against the rotary body to stop its rotation.

The fundamental construction of this brake assembly is already known and is found in three different types of braking mechanisms. In a first type of braking mechanism, the rotary body is a drum and the braking member is composed of a pair of brake arms extending around the periphery of the drum. An operating arm pulls the brake arms towards the rotary body where brake pads contact the drum. A second known braking mechanism is the band brake wherein the braking member is composed of a brake band which is pulled toward the rotary body by an operating lever to engage with the rotary body. A third type of braking mechanism is the disc brake wherein the rotary body is a disc and the braking member is composed of a pair of pads, a caliper body supporting these pads, and an operating means for moving one of the pads into contact with the disc.

In the three types of braking mechanisms just described, the rotary body is screwed onto the mounting tube of the hub to rotate together with the hub. During the braking operation in the forward running of the bicycle, the braking torque applied to the rotary body causes it to rotate relative to the mounting tube in a direction towards the tightening of the rotary body on the mounting tube thereby preventing the rotary body from being loosened. However, during the braking operation in the rearward running of the bicycle, the braking torque works in an opposite direction which tends to unscrew or loosen the rotary body from the mounting tube.

To counteract the tendency for the rotary body to loosen from the mounting tube, a lock nut is generally provided. However, unless some type of sufficient clamping is provided when the rotary body is engaged with the mounting tube, the rotary body may become loose even when the lock nut is present. This is because without sifficient clamping between the rotary body and mounting tube, the rotary body receives braking torque through the braking operation during the forward running of the bicycle and is therefore screwed tighter on the mounting tube. This produces a gap between the rotary body and the lock nut causing the lock nut to loosen whereby it may become disengaged from the rotary body due to the vibrations occurring during the normal bicycle operation. Thus, during the braking operation in the rearward running of the bicycle, the rotary body may become disengaged from the mounting tube or, at least, noise may be generated as the rotary body again contacts the lock nut if the rotary body cannot loosen to the point of becoming disengaged from the mounting tube.

The present invention provides a brake mechanism for a bicycle which overcomes the problems of a loose rotary body. An object of the present invention is to provide a brake mechanism of simple construction, which dispenses with the lock nut but yet does not allow for a loosening of the rotary body from the mounting tube even if braking torque is applied during rearward running of the bicycle. To this end, a coil spring, which has its diameter reduced by rotation of the rotary body in the loosening direction, i.e., counter to the screwing direction, is mounted on the rotary body. When the rotary body is in engagement with the mounting tube, the inner peripheral face of the coil spring is brought into pressure contact against the outer peripheral face of the hub mounting tube.

The coil spring not only reduces its diameter upon application of force along its screwing direction, it also expands its diameter upon application of force along the direction opposite to the screwing direction. Consequently, the coil spring fastens itself on the rotary body with a large force during the reduction of the coil spring diameter. The coil spring action is used to reliably prevent the rotation of the rotary body in its unscrewing direction without reliance on a lock nut, and the screwed engagement of the rotary body with the mounting tube is positively retained by the fastening action of the coil spring during the diameter reduction. On the other hand, the coil expands to permit rotation of the rotary body in a direction of tightening itself on the mounting tube.

These and other objects of the present invention will be apparent from the embodiments described below in accordance with the accompanying drawings.

BRIEF DESCRIPTION OF THE DRAWINGS

FIG. 6 is a rear view of a further embodiment employing the brake mechanism of the present invention.

Figure 1:
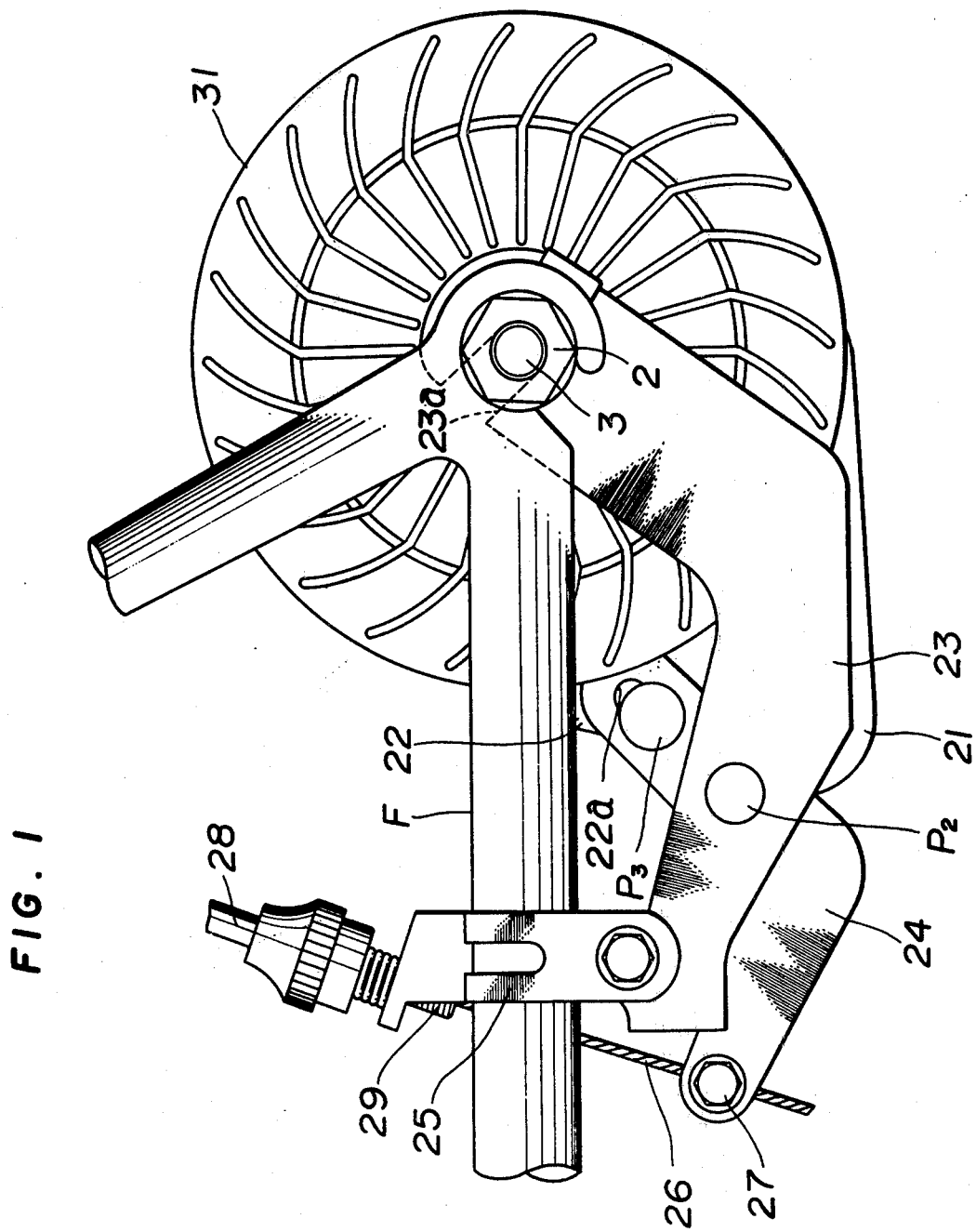
FIG. 1 is a front view of one embodiment of a brake mechanism in accordance with the present invention.
Figure 2:
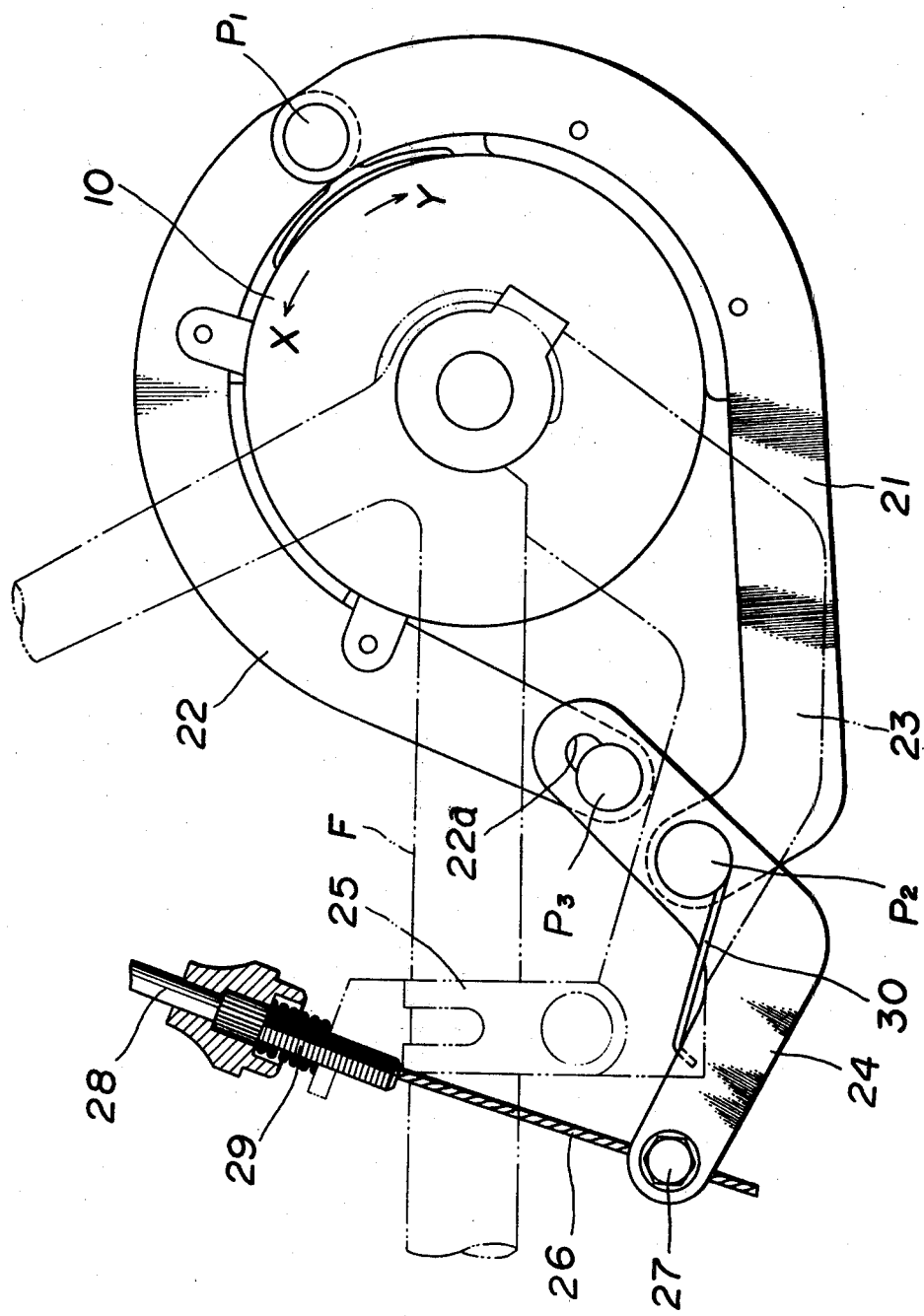
FIG. 2 is a front view of an essential portion of FIG. 1 but omitting a plate and support member.
Figure 3:
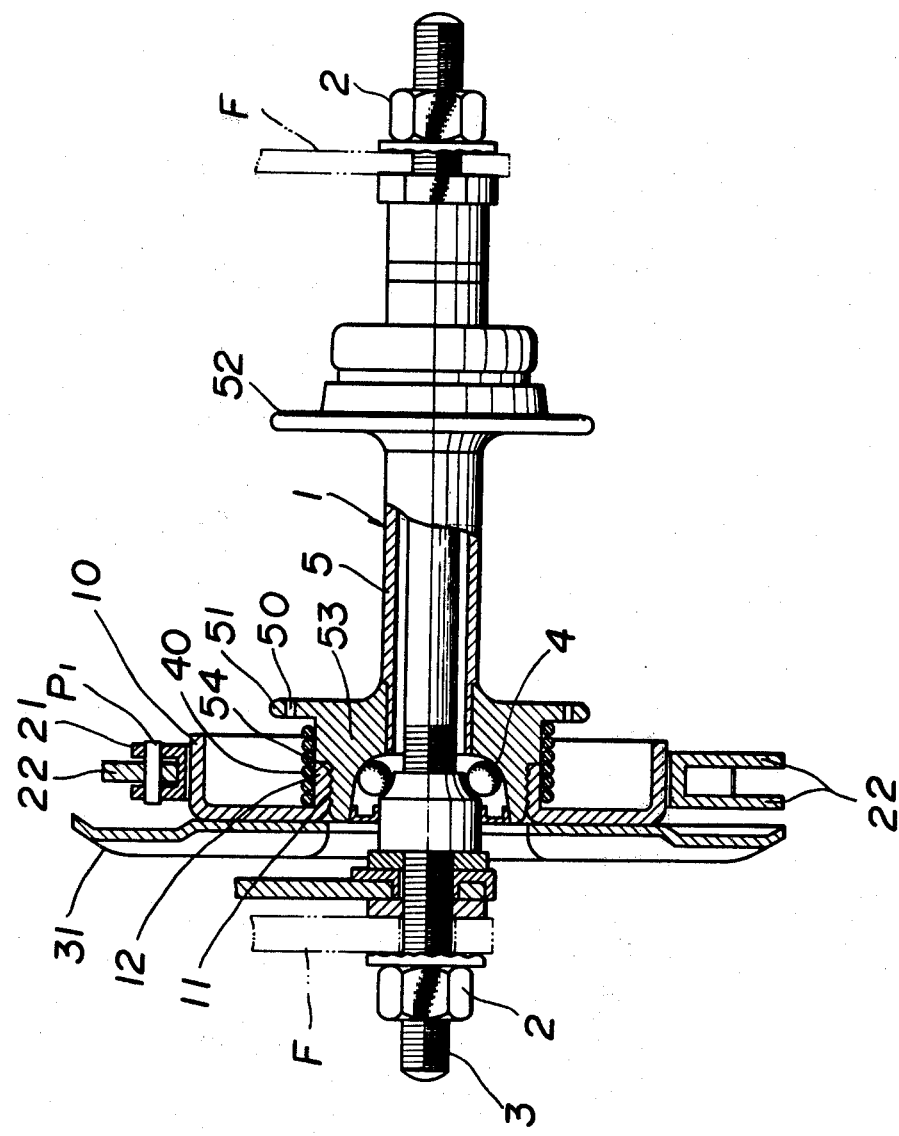
FIG. 3 is a cross-sectional view of the embodiment shown in FIG. 1.
Figure 8:
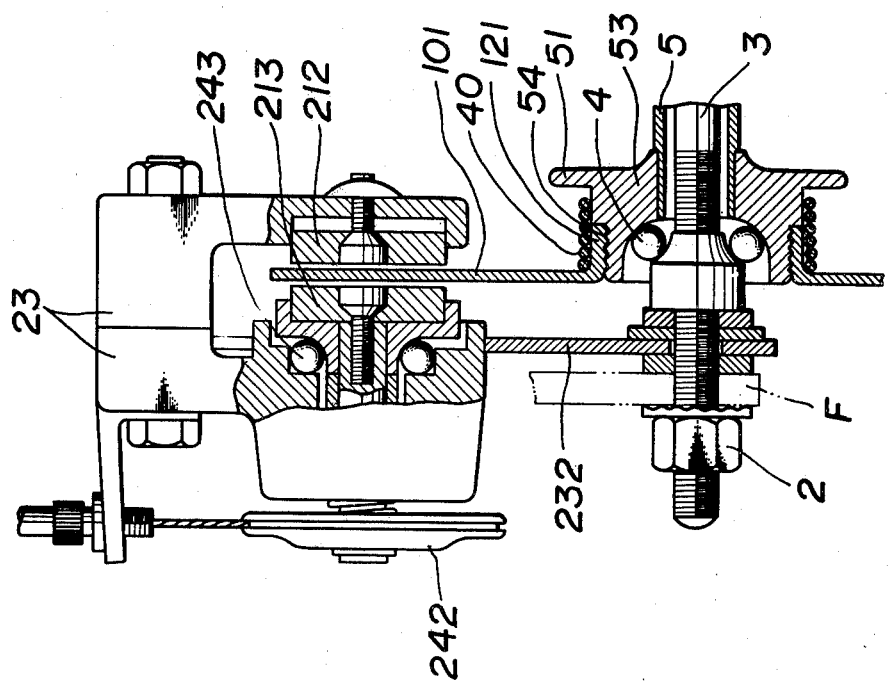
FIG. 8 is a partially omitted cross-sectional view of still another embodiment employing the brake mechanism of the present invention.
Figure 7:
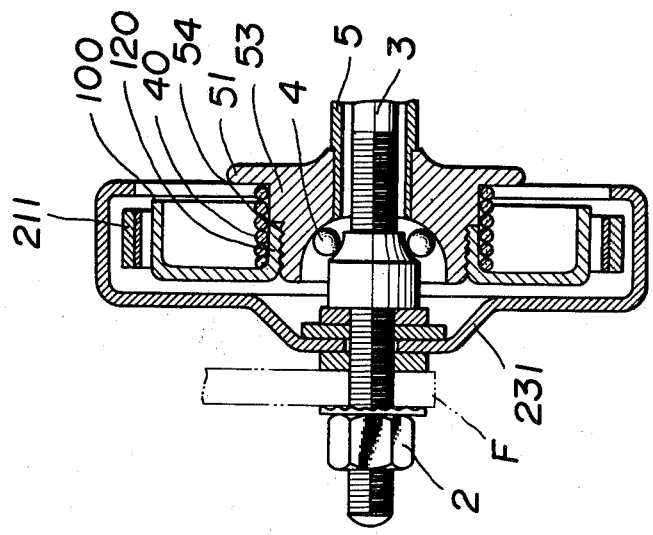
FIG. 7 is a cross-sectional view of the brake mechanism shown in FIG. 6.

The brake mechanism shown in FIGS. 1 thru 3 is of the type employing a pair of brake arms; the brake mechanism shown in FIGS. 6 and 7 is of the type employing a pair of brake bands; and, a disc brake mechanism is illustrated in FIG. 8.

DETAILED DESCRIPTION OF THE INVENTION

Referring to the drawings, a bicycle hub 1 is engaged with an associated brake mechanism by a screw coupling. The hub is composed of a hub shaft 3 secured by a nut 2 to the frame F of the bicycle and a hub shell 5 rotatably supported through balls 4 on the hub shaft 3. The hub shell 5 is provided with a pair of first and second hub flanges 51 and 52, the former hub flange having a spoke hole 50 and a mounting tube 53 at the axial and outward portion thereof. An outside screw thread 54 is provided on the outer periphery of the mounting tube 53.

Figure 4:
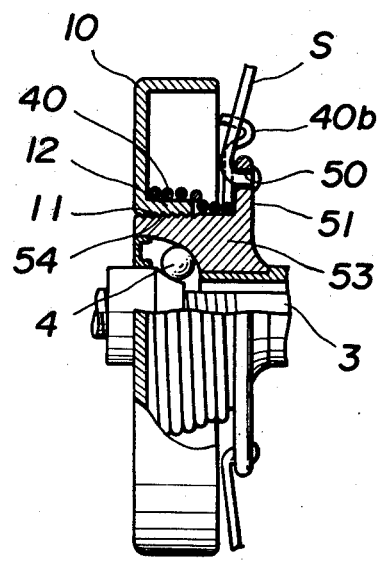
FIG. 4 is a partial cross-sectional view showing a variation in the embodiment of the brake mechanism of FIG. 3.

The mounting tube 53 shown in FIGS. 3, 7 and 8 is composed of a large diameter and a small diameter portion; however, a single diameter may be used as illustrated in FIG. 4. The screw thread 54 is provided on the small diameter portion or the outermost portion of the single diameter tube (FIG. 4).

As is well known, the above-described hub construction can be a rear hub forming part of a rear wheel or a front hub forming part of a front wheel of a bicycle. The brake mechanism employing the present invention described below is engaged via a screw coupling with the mounting tube 53 of the hub 1.

The FIGS. 1 thru 3 brake mechanism embodiment will be described first.

Referring to FIGS. 1 thru 3, a rotary body 10 is engaged with the mounting tube 53 of the hub 1. The rotary body 10 is composed of a drum provided at its center with a boss 12 having a screw thread 11, which is engaged with the screw thread 54 of the mounting tube 53. The axial length of the boss 12 is approximately equal to the axial length of the small diameter portion of the mounting tube 53. The outer diameter of boss 12 has the same dimensions as the outer diameter of the large diameter portion of mounting tube 53. When the boss 12 is screwed to the mounting tube 53, a continuous peripheral face is formed by the boss 12 and the large diameter portion of the mounting tube 53. The screw thread 54 of the mounting tube 53 and the screw thread 11 in the boss portion 12 of the rotary body 10 are provided, respectively, in a direction to be screwed together through a braking operation during the advancing operation of the hub shell 5 rotation, i.e., the forward running to the bicycle. In the drawings, a right-handed screw is used.

Numberals 21 and 22 represent a pair of first and second brake arms each having an arc-shaped contact face which comes into contact with the circular outer peripheral face of the rotary body 10. Each of the brake arms is composed of a metallic plate and the two plates are curved and connected to form a continuous arc as shown in FIG. 2. The ends along the lengthwise direction of each of arms 21 and 22 are pivotally connected together by one connecting pin P1. A support member 23 is provided for supporting the brake arms 21 and 22 and an operating arm 24 of the brake arms 21 and 22. the support member 23 is composed of a metallic plate, which is, at its middle portion, bent into an obtuse angle. A cutout 23a (FIG. 1), which is engaged with the hub shaft 3, is provided in on end along the lengthwise direction of the support member 23. The cutout 23a is adapted to be secured, together with the hub shaft 3, on the bicycle frame F by the nut 2. A clamping band 25, which is secured to the frame F, is mounted on the other end of the support member 23. Thus, the support member 23 is firmly secured to the frame F through clamping of the nut 2 and the clamping of the clamping band 25.

The other end of the first brake arm 21 is pivotally mounted, together with the middle portion of the operating arm 24, on the support member 23 by a pin P2.

Also, the other end of the brake arm 22 is pivotally connected, by one connecting pin P3, with one end of the operating arm 24.

A long hole 22a is provided in the other end of the second brake arm 22. The pin P3 extends through the long hole 22a.

The operating arm 24 is of a bell crank type and is bent, at its middle portion, at approximately 90 degrees. One end side from the bent portion is pivoted, by the pin P2, together with the first brake arm 21 and is urged in one direction (counter clockwise as viewed in FIG. 2) with a return spring 30. A fixture 27, which secures one end of the operating wire 26 in place, is provided on the other end of the operating arm 24 while the other end of the operating wire 26 is connected with an operating lever (not shown).

An outer tube 28 for guiding the wire 26 is supported, at its one end, by an outer receiver 29 in the support member 23. When wire 26 is pulled by the operating lever it causes the operating arm 24 to move in opposition to the force of spring 30 and rotate in a clockwise direction around the pin P2 in FIG. 2. As a result, both brake arms 21 and 22 are rotated about pin P1 to approach one another. The contact faces provided on arms 21 and 22 are adapted to be brought into contact against the outer peripheral face of the rotary body 10 to perform the braking operation.

A radiating plate 31 with fins thereon is adapted to efficiently discharge the friction heat of the rotary body 10 caused by the braking operation. The radiating plate is mounted in close adherence by a suitable mounting means on the outer side face of the rotary body.

A coil spring 40 which is longer than the axial length of the boss portion 12 is wound, as shown in FIG. 3, on the outer periphery of the boss portion 12 of the rotary body 10 and the outer periphery of the mounting tube 53 to prevent a loosening of the screw coupling between the rotary body 10 and mounting tube 53 of the hub 1. This loosening could be by a braking operation performed during the rearward movement of the bicycle, namely, during the rotation of the wheels in the direction of an arrow Y of FIG. 2. The coil spring 40 is wound helically in the same direction as the screw threads 11 and 54 and is formed on the outer peripheral face of the boss 12 so that the spring diameter is reduced by the relative rotation of the rotary body in the loosening direction with respect to its screwing direction on mounting tube 53. The natural or unstressed internal diameter of the coil spring may be equal to or less than the outer peripheral diameter of the boss portion 12.

With this coil spring arrangement, the rotary body 10 is engaged with the mounting tube 53 of the hub 1. As the braking operation is performed when the wheels are being rotated in the direction of an arrow X of FIG. 2, i.e., the forward running operation of the bicycle, the torque of the hub 1 causes the rotary body 10 to relatively rotate in a direction where it is further screwed onto the mounting tube 53. Thus, any looseness in the initial screwing of the rotary body 10 to the mounting tube 53 is compensated for through this relative rotation. When this relative rotation occurs, the coil spring 40 expands in diameter to freely permit rotation of the rotary body 10. On the other hand, if the braking operation is performed during the rearward running of the bicycle, namely, during the rotation of the wheels in the direction of an arrow Y of FIG. 2, the rotary body 10 tends to relatively rotate in the loosening direction with respect to the mounting tube 53. However, loosening of the rotary body from the mounting tube is preventing by the coil spring 40 wound helically in the same direction as the screw threads 11 and 54. This is because the coil spring is in pressure contact across the outer peripheral face of the boss 12 and the adjacent outer peripheral face of the mounting tube 53 and any relative rotation of the rotary body 10 in the loosening direction with respect to the mounting tube 53 causes a reduction in diameter of the coil spring 40 thereby increasing the pressure contact force applied to the outer peripheral face of the rotary body boss 12 and mounting tube 53. Thus, the coil spring holds the rotary body to the mounting tube and prevents it from becoming loose.

With the above-described method of mounting the coil spring 40 with respect to the boss 12, it is necessary to bring the inner peripheral face of the spring 40 into pressure contact against the outer peripheral face of the boss 12 through elasticity of the coil spring 40. Alternatively, one end 40a of the coil spring 40 may be engaged with boss 12 at a proper location thereon or on the rotary body 10. The same may be true with respect to the mounting of the other end 40b of the coil spring 40 relative to the mounting tube 53; that is, end 40b may be engaged at a proper position on the mounting tube 53 or on the hub itself. As shown in FIG. 4, to facilitate the mounting of the spring onto the mounting tube 53, the end 40b may be hooked on the spoke S which is mounted into the spoke hole 50 the the hub flange 51.

Figure 5:
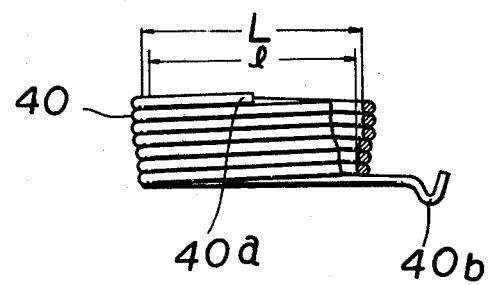
FIG. 5 is a partially notched front view of the coil spring shown in FIG. 4.

In the above-described embodiment, the screw thread 54 portion of the mounting tube 53 is smaller in diameter by an amount equivalent to the thickness of the boss 12; that is, the outer peripheral face of the boss 12 and the outer peripheral face of the large diameter portion of the mounting tube 53 have the same diameter. A step difference may also be formed between the outer peripheral face of the boss 12 and the outer peripheral face of the mounting tube 53 as shown in FIG. 4. In this case, the coil spring 40 has different diameters l and L, between one end side and the other end side along the shaft core direction, as shown in FIG. 5, to provide pressure contact against the outer peripheral faces of the boss 12 and the mounting tube 53.

In the foregoing embodiment, a braking member is formed by a pair of brake arms 21 and 22. However, as shown in FIGS. 6 and 7, a brake band 211 encircling the rotary body 10 may be used. In addition, as shown in FIG. 8, a pair of pads 212 and 213 which are supported by a caliper body 233 on either side of a rotary body 101 may also be used.

Describing the embodiment shown in FIGS. 6 and 7, one end of the brake band 211 is supported, by a pin P4, on a support member 231, which is secured respectively, through the nut 2 and a clamping band 251 to the hub shaft 3 and the frame F. The other end of the brake band is supported, by a pin P6, on a bell crank 241, which is pivoted through a pin P5 on the support member 231. The bell crank 241 is oscillated and operated by an operating wire or an operating rod 261 to clamp the brake band 211 against the outer peripheral face of the rotor body 100 for a braking operation. Similar to the FIGS. 1 thru 3 embodiment, a rotary body 100 is screwed onto the mounting tube 53 and a coil spring 40 extends across the outer peripheries of the boss 120 and mounting tube 53 to prevent loosening of the screw coupling between the rotary body 100 and mounting tube 53.

In the disc brake embodiment shown in FIG. 8, a disc shaped rotary body 101 is secured to the mounting tube 53. The caliper body 233 is supported on a support member 232, which is secured respectively through the nut 2 and a clamping band (not shown) to the hub shaft 3 and the frame. A stationary pad 212 and a movable pad 213, which come into contact with the axial sides of the disc 101, are mounted on the caliper body 233. An operating body 242 for axially moving the movable pad 213 is also provided. The movable pad 213 is moved upon operation of a brake control lever (not shown) in the axial direction of a disc 101 by a cam means 243, through operation of the operating body 242, to contact against one side face of the disc 101. The caliper body 233 is axially moved by the reaction of the pad 213 contacting the rotary disc 101 to press the stationary pad 212 against the other side face of the disc 101 for the braking operation.

Since the band brake and the disc brake operating mechanisms are conventional, they will be sufficiently understood without a further detailed description, the invention residing in the means for maintaining the screw coupling between the rotary body and mounting tube 53.

In each of the FIGS. 6 and 7 and FIG. 8 embodiments, a rotary body is provided at its central portion with a boss portion, 120 for rotary body 100 and 121 for rotary body 101. The coil spring 40 is mounted, as in the first-described embodiment, on the outer periphery of the boss portions 120 and 121 and extends over the outer periphery of the mounting tube 53.

As described hereinabove, the present invention effectively utilizes a coil spring mounted on the outer periphery of a boss of a rotary body and extending over the outer periphery of a mounting tube which reduces its diameter through rotation in the loosening direction with respect to the screwing direction of the hub with the rotary body to prevent undesired loosening of the rotary body. When the rotary body is engaged with the mounting tube of the hub, the inner peripheral face projecting from the boss portion of the coil spring is adapted to be brought into pressure contact against the outer peripheral face of the hub. During the braking operation when the bicycle is running rearwardly, the rotary body performs relative rotation with respect to the hub in the loosening direction through the braking torque working upon the rotary body. However, this action causes the coil spring to reduce in diameter and increase the pressure contact force with respect to the hub outer peripheral face to thereby prevent loosening of the rotary body.

Also with the above-described construction, the rotary body is automatically screwed onto the mounting tube due to braking operation during the forward running of the bicycle and a lock nut is no longer needed to prevent loosening of the rotary body. This avoids problems caused by a loosening of the lock nut or its slipping off the brake mechanism because of vibrations, etc. while further preventing the generation of abnormal sounds.

While the invention has been described with reference to several exemplary embodiments, it is not limited to them. Various modifications can be made without departing from the spirit an scope of the invention which is therefore defined solely by the appended claims.

What is claimed is:

1. A brake mechanism for a bicycle which is screwed into engagement with a mounting tube forming a portion of a hub for a bicycle, the hub further comprising a hub shaft, a hub shell rotatably supported on said hub shaft, and a pair of hub flanges provided on said shell, comprising:

a rotary body screwed onto the mounting tube of a hub to rotate together with said hub, a cylindrical boss having a screw thread engaged with a screw thread on said mounting tube being provided on the center of said rotary body, a braking member having a contact face which contacts said rotary body to stop the rotation of the rotary body, and a coil spring wound on the outer periphery of the boss portion of said rotary body, the inner diameter of said coil spring being the equal to or smaller than the outer diameter of said boss portion in its unstressed condition, the inner face of said coil spring being in contact against the outer periphery of said boss portion, one end of said coil spring along the lengthwise direction extending onto said mounting tube when said rotary body is engaged with said mounting tube, the inner face of said extending portion being in contact against the outer peripheral face of said mounting tube, said coil spring having its diameter reduced through the rotation of said rotary body in a direction which would unscrew the rotary body from said mounting tube.

2. A brake mechanism for a bicycle according to claim 1, wherein said rotary body includes a drum having a cylindrical boss at its center, and said braking member includes a pair of first and second brake arms which come into contact against the outer peripheral face of the drum, an operating arm for operating the first and second brake arms, and a support member for supporting each of said arms.

3. A brake mechanism for a bicycle according to claim 2, wherein said support member includes a securing means for securing said support member onto said hub shaft and the frame of a bicycle.

4. A brake mechanism for a bicycle according to claim 2, wherein said operating arm has a securing means for an operating wire and said support member has a suppot means for an outer tube for guiding said operating wire, said operating arm being rotated to bring said first and second brake arms into contact against the outer peripheral face of said drum by the pulling operation of the wire.

5. A brake mechanism for a bicycle according to claim 2, wherein said first and second brake arms are pivotally connected by one connecting pin, said first brake arm being pivotally provided on said support member, said second brake arm being pivotally provided on the operating arm by one connecting pin.

6. A brake mechansim for a bicycle according to claim 1, wherein said rotary body includes a drum with a cylindrical boss portion in its center and said braking member includes brake bands which come into contact against the outer peripheral face of said drum, an operating arm for operating said bands, and a support member for supporting said arm.

7. A brake mechanism for a bicycle according to claim 1, wherein said rotary body is formed as a disc with a cylindrical boss in its center, and said braking member includes a pair of pads which come into contact against the axial sides of said disc, a caliper body for supporting said pads, a support member for supporting the caliper body and an operating body for moving one of said pads.

8. A brake mechanism for a bicycle according to claim 1, wherein said coil spring has the same peripheral diameter across its full axial length.

9. A brake mechanism for a bicycle according to claim 1, wherein the portion of said coil spring extending from said boss is smaller in diameter than the inner diameter of the portion wound on said boss.

10. A brake mechanism for a bicycle according to claim 1, wherein said coil spring has a first end portion which engages with the outer periphery of the boss portion of the rotary body and a second end portion which engages with the mounting tube of said hub.

11. A brake mechanism for a bicycle according to claim 1, wherein said coil spring has a first end portion which engages with the outer periphery of the boss portion of the body and a second end portion which extends outwardly in the radial direction of the hub flange to engage with a spoke mounted on a hub flange.

* * * * *